Patented Feb. 14, 1950

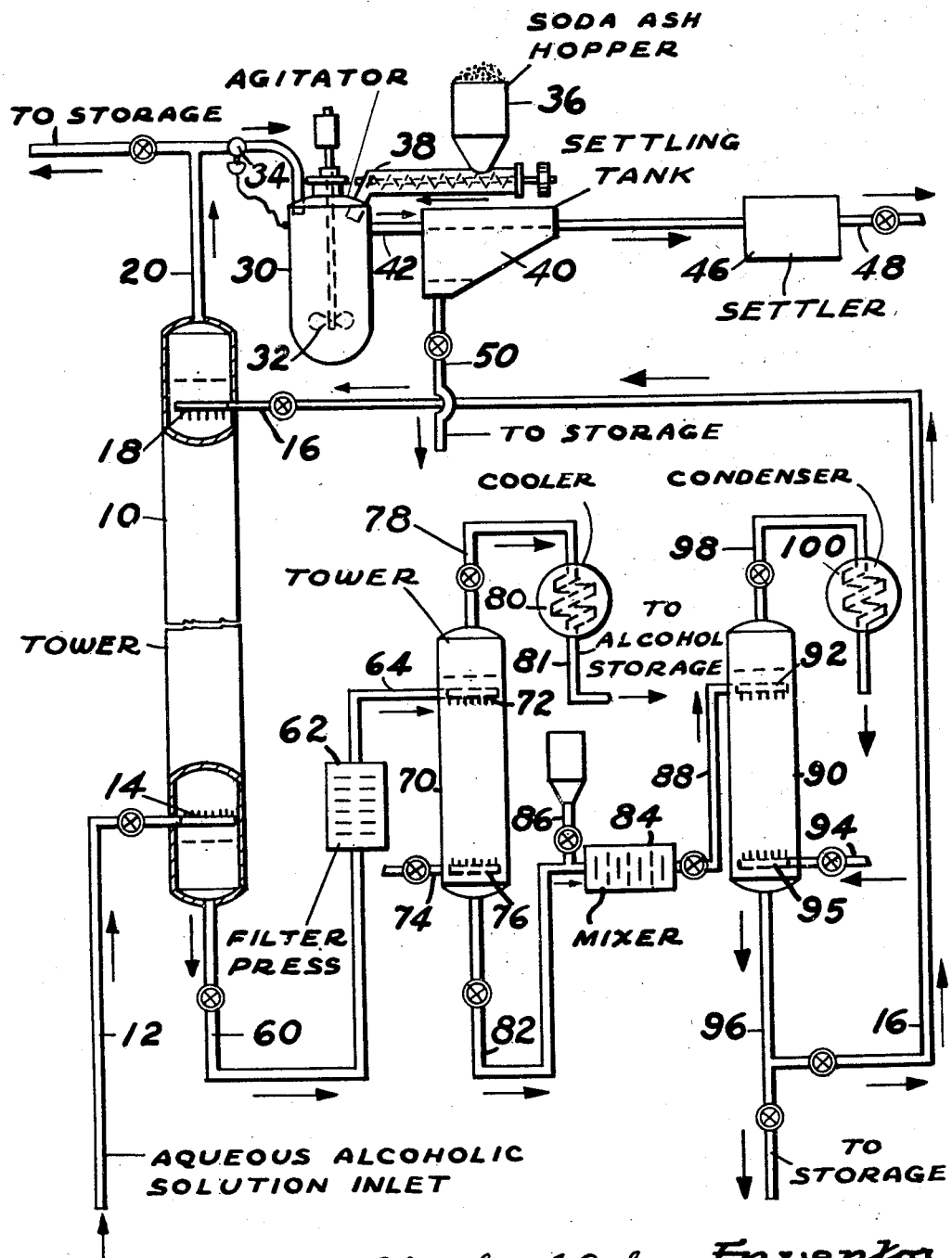

2,497,152

UNITED STATES PATENT OFFICE 2,497,152

PURIFICATION OF PETROLEUM SULFONATES

Charles A. Cohen, Roselle Park, N. J., assignor to Standard Oil Development Company, a corporation of Delaware Application December 31, 1946, Serial No. 719,371

12 Claims. (Cl. 260—504)

This invention relates to an improved process for the purification of oil-soluble hydrocarbon sulfonates commonly known in the petroleum industry as the mahogany sulfonates.

In the treatment of the higher petroleum distillates with strong sulfuric acid for the preparation of highly refined mineral oils for uses such as medicinal white oils, transformer oils, refrigerator oils and the mineral oil used in the cosmetic industry two commercial by-products are obtained. Both of these by-products are sulfonated hydrocarbons differing in their commercial usage as a result largely of difference in molecular weight and degree of sulfonation, and consequently in their solubilities in oil, water and water-soluble organic solvents. The substantially water-soluble sulfonic acids commonly called green acids are obtained from the sludge layer after acid treatment. The substantially oil-soluble sulfonates commonly called the mahogany sulfonates remain in the oil layer after the acid sludge separation has been made. The mahogany acids and soaps vary in color from a pale amber to a deep red and are generally made commercially available admixed with oil and varying percentages of water. In these commercial solutions the sulfonate varies usually from about 25% to 70% by weight of pure soap.

The uses to which the mahogany soaps are applied are as emulsifying agents in the preparation of soluble oils for use in textile wet finishing, cutting oils for the metal trades, fat liquoring of leather, fat splitting agents, wetting agents, surface tension depressants and lubricating oil additives. For such uses varying degrees of purification are necessary. The purification commonly involves the preparation of what is commonly termed "technical sulfonates," that is, involves merely the removal of inorganic salts associated with the sulfonates. The inorganic salts are associated with the sulfonate as a result of the initial acid treatment and subsequent neutralization of the oil. The impurities present are usually sodium sulfate, sulfite and excess alkali usually sodium hydroxide and sodium carbonate used for the neutralization. The removal of the inorganic salts is the subject matter of the present invention.

In the preparation of the oil-soluble sulfonates a petroleum distillate such as that of lubricating oil range is treated with strong sulfuric acid, usually fuming acid containing 20% of free $SO_3$. After the acid treatment, the acid sludge is separated by settling and usually subsequent centrifuging. The acid oil is then neutralized with an alkali, usually sodium hydroxide or sodium carbonate. The oil-soluble sulfonates are then extracted from the neutralized oil with an aqueous alcohol solution commonly of isopropyl alcohol of strength varying between about 40 to 60% by volume of alcohol. The volume of this aqueous alcohol employed is usually determined by that volume which gives a concentration of the sulfonates in the alcohol solution lying between 5 and 15 grams of sulfonate per 100 mls. of solution. With lower concentrations of sulfonate in the solution excessive quantities of alcohol have to be recovered in a subsequent distillation and with higher concentrations in the solution there is an excessive co-extraction of oil along with the sulfonate.

The alcohol solution of the oil soluble sulfonates may contain as impurities free alkali, that is, either sodium hydroxide or sodium carbonate, the alkali sulfates and sulfites in addition to quantities of dissolved and mechanically dispersed oil. Usually, in the preparation of "technical soaps," the dissolved and mechanically dispersed oil is not removed from association with the sulfonate in purification treatment. Often, prior to final evaporation, the technical soaps are diluted by the addition of further quantities of oil to produce mahogany sulfonates of commercial quality which range in soap concentration from about 50% to 70% by weight. Thus, "technical soaps" may be stated to be oil-soluble sodium sulfonates dissolved in minor quantities of oil which are substantially free of inorganic salts and of low boiling solvents. The present invention is concerned with preparing such highly concentrated solutions of technical oil soluble sulfonates.

An object of the invention is to furnish a convenient and easily operable process for the refining of oil soluble sulfonates from crude aqueous alcoholic solutions.

Another object of the invention is to prepare the alkali soaps of the oil soluble sulfonates in a degree of purity involving less than 0.1% by weight of inorganic salts based on the technical soap. Other objects of the invention will be apparent by the following descriptions and illustrations of the invention.

Process according to the invention involves treating the aqueous alcoholic solutions of the oil soluble sulfonates with aqueous solutions of sodium sulfate. Usually the sulfonate solutions treated are those in which the mahogany sulfonate is present in the solution in amounts between 5 and 15 grams per 100 mls. per solution and in which the concentration of alcohol is from about 35 to about 50% by volume. The alcohols which may be employed are the $C_2$ to $C_4$ monohydric alcohols. Of these alcohols, ethyl and isopropyl alcohols are those commonly employed. The aqueous sodium sulfate solution employed as the refining agent for the crude sulfonate solutions varies in strength from about 15 to saturation quantities but preferably the concentration is between 20 to 40 grams of sodium sulfate per 100 mls. of solution.

The temperature of the treatment is dependent largely upon the concentration of sodium sulfate solution employed. With the lower concentrations of sodium sulfate a temperature of about 70° C. must be employed. With concentrations of sodium sulfate of about 40 grams per 100 ml. the temperature range is usually between 40° C. and 70° C. and preferably about 40° C. At the lowest concentrations of sodium sulfate complete miscibility of the solution and the aqueous alcohol solution of the sulfonate occurs at temperature of about 20 to 30° C. Phase separation occurs in such circumstances at temperatures of about 70° C.

With concentrations of about 20 grams of sodium sulfate per 100 mls. substantial removal of inorganic salts from the crude alcoholic solution occurs at temperature of about 40° C. but practically no dehydration of the alcoholic solution takes place. At concentrations of sodium sulfate of about 40 grams per 100 mls. and at a temperature range of 40 to 70° C. complete removal of the inorganic salts occurs and in addition part of the water is abstracted from the alcoholic solution thereby increasing the alcoholic content and also the sulfonate concentration. The volume of sodium sulfate solution employed in the treatment of the aqueous alcoholic solution depends largely upon the concentration of alcohol in the crude alcoholic solution and the concentration of the sodium sulfate solution. With sodium sulfate solutions of between about 30 grams per 100 mls. and saturated solutions as much as three volumes of sulfate solution per volume of sulfonate solution is commonly employed. With stronger concentrations of alcohol, for example in the range of 45 to 55% and concentrations of sulfate of about 40 grams per 100 mls. somewhat less than one volume of sulfate per volume of sulfonate has been found satisfactory. Usually, however, in countercurrent processing about equal volumes of both solutions are employed. The treatment may be effected batch-wise using a succession of applications of sulfate solution or may be operated countercurrently in a system of agitators and settlers.

In order to effect further purification of the sulfonates treatment of the resultant aqueous alcoholic solutions may be effected with solid sodium carbonate either anhydrous or as the monohydrate at temperatures above about 35° C. The quantity of sodium carbonate required to effect this purification is fixed at that quantity which will be in solution equilibrium with the sodium sulfonate solution being treated and will be present in slight excess above its solubility in the aqueous alcoholic solution at the temperatures at which treatment occurs. For practical purposes, this temperature will be within the range from 40° to 70° C. Under these conditions a quantity of water is abstracted from the sulfonate solution taking with it any inorganic salts present and the concentration of alcohol becomes higher. When the alcohol employed is isopropyl alcohol, this concentration approaches 83% by volume. In the case of ethyl alcohol, this concentration approaches 80% by volume. This concentration of alcohol represents the equilibrium concentration of alcohol obtained between aqueous alcohol and saturated sodium carbonate. In such a concentration of alcohol all of the sulfonate is soluble, and substantially none of the inorganic salts present in the system are soluble.

In order that the invention may be more fully understood, the following description and illustration is presented of a particular embodiment. Figure 1 presents a flow diagram of suitable processing of an aqueous isopropyl alcoholic solution containing about 10 grams of oil soluble sulfonate per 100 mls. of solution and with an alcohol concentration of about 45% by volume.

The aqueous alcoholic solution is shown as passing through line 12 into the lower part of the tower 10, and sprayed upwards through sprayheads 14. The tower 10 may be any form of liquid-liquid contacting equipment such as a packed tower, or bubble plate tower or perforated plate tower or filled with packing material such as Raschig rings. Through line 16 near the top of the tower an aqueous solution of sodium sulfate containing about 40 grams of sodium sulfate per 100 mls. of solution is passed and sprayed downwards through sprayheads 18. In this manner the aqueous alcoholic solution of sulfonates is countercurrently contacted with the sodium sulfate solution at a temperature of about 40° C. The height of the tower and the type of contacting devices within the tower are largely determined by the strengths of the sulfonate and the sodium sulfate solutions.

Taken overhead through line 20 is the purified aqueous alcoholic solution of the sulfonates. The sulfonates so obtained may be sent to commercial storage directly as a technically pure sulfonate or passed for further processing through line 22 into the agitator 30. The agitator 30 is fitted with a stirring device 32 and a temperature controlling device 34. From the hopper 36 sodium carbonate is passed through line 38 into the agitator 30. The sodium carbonate passed from the hopper 36 may be powdered or granular in nature and may be anhydrous or the monohydrate. The amount of sodium carbonate added is generally in an amount equal to about 0.2 lb. of sodium carbonate per gallon of crude alcoholic solution supplied to the tower 10 through line 12. The temperature maintained in the agitator 30 is controlled between 40° and 70° C.

As a result of the agitation in equipment 30 a temporary emulsion of alcoholic sulfonate saturated sodium carbonate and solid sodium carbonate is obtained. The treated mixture is allowed to overflow through line 42 into the settling tank 40. In the tank 40 two layers readily separate. The upper layer containing substantially all the sulfonate soaps passes to a settler 46 to separate out any suspended sodium carbonate and thence through line 48 to storage.

Instead of settling equipment 46 the purified alcohol solution may be passed through a plate and frame filter press which has been previously precoated with a standard filter aid. The lower layer formed in the tank 40 is removed through line 50 storage equipment and then used for neutralization of the acid oil.

From the base of the tower 10 the spent sodium sulfate solution is removed through line 60 and passed usually through a filter press 62 to remove any suspended impurities commonly iron oxide. From the filter press through line 64 the sodium sulfate solution is passed to tower 70. In the tower 70 the sodium sulfate solution is sprayed downwards from the sprayhead 72 and is thus countercurrently treated with steam passed into the lower portion of the tower through line 74 and sprayed upwards through sprayhead 76. Taken overhead through line 78 aqueous alcohol vapors are removed. These vapors are passed through cooler 80 and thence through line 81 to crude alcohol storage. From the bottom of the tower 70 through line 82 the sodium sulfate is passed and prior to entering the mixer 84 dilute sulfuric acid is added through line 86. In the mixer 84 any free alkali and sodium sulfite present in the sodium sulfate solution is converted to sodium sulfate. From the mixer 84 the sodium sulfate solution is passed through line 88 to the tower 90. The sodium sulfate solution enters tower 90 near the top and there sprayed downward through sprayhead 92. Into the lower part of the tower through line 94 and through sprayheads 95 steam is injected upwards. The sodium sulfate solution is thus countercurrently treated with steam. From the bottom of the tower through line 96 concentrated sodium sulfate is passed to storage for subsequent use in the process. Taken overhead through line 98 are the volatile impurities which are condensed in equipment 100 and then passed to the sewer.

In processing according to the embodiment as described with the tower 20 ft. in height and passing the crude aqueous alcoholic solution at a distance 1½ ft. from the bottom of the tower and the sodium sulfate solution admitted 1½ ft. from the top, and with suitable heating means the following data were obtained.

TABLE I

*Extraction of crude soap solution with sodium sulfate*

| Experiment No. | 1 | 2 | 3 |
|---|---|---|---|
| Total Volume of Tower, Liters | 28.4 | 28.4 | 28.4 |
| Volume of Packing, Liters | 9.0 | 9.0 | 9.0 |
| Free Space of Tower, Liters | 19.4 | 19.4 | 19.4 |
| Crude Alcohol Feed, Liters/Hour | 9.7 | 20.2 | 20.0 |
| Concentrated Sulfate Feed, Liters/Hour | 8.3 | 20.7 | 20.0 |
| Purified Alcohol—Soap Overflow, Liters/Hr. | 6.3 | 13.2 | 12.0 |
| Spent Sulfate Draw Off, Liters/Hour | 11.7 | 27.7 | 28.0 |
| Temperature of Extraction, °C | 42 | 70 | 40 |
| Analysis of Crude Soap Solution (Line 12): | | | |
| Total Solids (Oil+Soap+Salts), Gm./100 ml | 11.1 | 11.2 | 11.7 |
| Technical Soap (Oil+Soap), Gm./100 ml | 9.8 | 9.6 | 9.8 |
| Dry Soap (Pure Sulfonate), Gm./100 ml | 8.7 | 8.7 | 9.0 |
| Inorganic Salts, Total, Gm./100 ml | 1.3 | 1.6 | 1.9 |
| Sodium Carbonate, Gm./100 ml | 0.4 | 0.6 | 0.7 |
| Sodium Sulphite, Gm./100 ml | 0.2 | 0.2 | 0.3 |
| Sodium Sulfate, Gm./100 ml | 0.7 | 0.8 | 0.9 |
| Alcohol, Per Cent by Vol. on Total Solution | 43.2 | 43.5 | 37.4 |
| Feed Sodium Sulphate, Gm./100 ml | 43.7 | 38.6 | 39.9 |
| Analysis of Purified Soap Solution (Line 22): | | | |
| Total Solids, Gm./100 ml | 15.10 | 14.78 | 16.34 |
| Technical Soap, Gm./100 ml | 15.07 | 14.70 | 16.24 |
| Dry Soap, Gm./100 ml | 13.34 | 13.32 | 14.95 |
| Inorganic Salts, Total, Gm./100 ml | 0.03 | 0.08 | 0.10 |
| Sodium Carbonate, Gm./100 ml | 0.00 | 0.00 | 0.00 |
| Sodium Sulphite, Gm./100 ml | 0.01 | 0.01 | 0.02 |
| Sodium Sulphate, Gm./100 ml | 0.02 | 0.07 | 0.08 |
| Alcohol, Per Cent by Vol. on Total Solution | 59.4 | 58.4 | 54.2 |
| Analysis of Spent Sulfate Liquor, Gm./100 ml.: | | | |
| Sodium Sulfate, Gm./100 ml | 31.0 | 28.9 | 29.2 |
| Sodium Sulphite, Gm./100 ml | 0.1 | 0.4 | 0.42 |
| Sodium Carbonate, Gm./100 ml | 0.4 | 0.5 | 0.20 |
| Alcohol, Per Cent by Vol., Gm./100 ml | 3.4 | 4.3 | 4.9 |
| Sodium Sulfonate | trace | trace | trace |

After the secondary purification with sodium carbonate with an agitator of about 5 gals. capacity and settler of 20 gals. capacity the following data were obtained.

TABLE II

*Dehydration of semi-purified soap solution with sodium carbonate*

| | |
|---|---|
| Semi-purified soap solution feed to agitator, liters/hr | 12.0 |
| Sodium carbonate feed (58% soda ash) kilo/hr | 0.46 |
| Residence time in agitator, hrs | 0.25 |
| Temperature of dehydration, °C | 50 |
| Residence time in settler, hrs | 2.0 |
| Purified soap solution overflow, liters/hr | 11.0 |
| Saturated sodium carbonate draw-off, liters/hr | 1.1 |
| Analysis of purified soap solution (Line 48): | |
| Total solids, gms./100 ml | 21.16 |
| Technical soap, gms./100 ml | 21.15 |
| Dry soap, gms./100 ml | 19.30 |
| Total inorganic salts, gms./100 ml | 0.01 |
| Sodium carbonate, gms./100 ml | 0.01 |
| Sodium sulfite, gms./100 ml | 0.00 |
| Sodium sulfate, gms./100 ml | 0.00 |
| Alcohol, vol. per cent on total solution | 60.0 |

These data demonstrate that treatment with sodium sulfate not only purifies the sulfonates by removing inorganic salts but also concentrates the sulfonates by effecting a removal of water from the crude alcoholic solution; that is, a more concentrated alcoholic solution of purified sulfonate is obtained by processing with sodium sulfate. Further treatment with sodium carbonate effects a further purification both as regards removal of inorganic salts and a further concentration of the alcohol in the solution.

In the use of sodium sulfate as a refining agent for the oil soluble sulfonate dissolved in the aqueous alcoholic solution no contamination of the products with the sulfate occurs due to the diluting effect of the treating solution resulting from the contacting of the more concentrated sodium sulfate solutions with the aqueous alcoholic solutions.

What is claimed is:

1. A process for purifying oil soluble petroleum sulfonates dissolved in an aqueous solution of a $C_2$ to $C_4$ monohydric alcohol containing at least about 40% alcohol which comprises treating said aqueous alcoholic solution of the oil soluble petroleum sulfonates with an aqueous solution of sodium sulfate containing at least 15 grams of sodium sulfate per 100 mls. of solution at a temperature between 40 and 70° C.

2. Process according to claim 1 in which the sodium sulfate solution is saturated at the temperature of treatment.

3. Process for removing inorganic salts from crude oil soluble petroleum sulfonates dissolved in aqueous alcoholic solutions containing at least 40% of a $C_2$ to $C_4$ monohydric alcohol which comprises counter-currently treating said aqueous alcoholic solution of the crude oil soluble petroleum sulfonates with an aqueous solution of sodium sulfate containing between 20 and 40 grams of sodium sulfate per 100 mls. of solution at a temperature between 40 and 70° C.

4. Process according to claim 3 in which the $C_2$ to $C_4$ monohydric alcohol is ethyl alcohol.

5. Process according to claim 3 in which the $C_2$ to $C_4$ alcohol is isopropyl.

6. An improved process for refining oil soluble petroleum sulfonates dissolved in an aqueous solution of a $C_2$ to $C_4$ monohydric alcohol containing at least 40% alcohol and containing between 5 and 15 grams of sulfonate per 100 mls.

of crude solution which comprises countercurrently treating the aqueous alcoholic solution of the crude oil soluble sulfonates with an aqueous sodium sulfate solution containing at least 20 grams of sodium sulfate per 100 mls. of solution at a temperature between 40 and 70° C. and then treating the resultant aqueous alcoholic solution of the sulfonate with solid sodium carbonate selected from the group consisting of anhydrous sodium carbonate and sodium carbonate monohydrate at a temperature of at least 35° C.

7. Process according to claim 6 in which the sodium carbonate is anhydrous.

8. Process according to claim 6 in which the sodium carbonate is monohydrate.

9. Process according to claim 6 in which the treatment with the solid sodium carbonate is at a temperature between about 40° C. to about 70° C.

10. Process according to claim 6 in which the quantity of sodium carbonate employed is in excess of the amount required to produce a saturated solution with respect to said alcoholic solution at the temperature employed for the dehydration.

11. Process according to claim 6 in which the alcohol is ethyl alcohol.

12. Process according to claim 6 in which the alcohol is isopropyl alcohol.

CHARLES A. COHEN.

REFERENCES CITED

The following references are of record in the file of this patent:

UNITED STATES PATENTS

| Number | Name | Date |
|---|---|---|
| 2,286,725 | Goodloe | June 16, 1942 |
| 2,316,719 | Russell | Apr. 13, 1943 |
| 2,365,828 | Loud | Dec. 26, 1944 |